United States Patent

Hsu et al.

(10) Patent No.: US 7,918,564 B2
(45) Date of Patent: Apr. 5, 2011

(54) COOLING SYSTEM

(75) Inventors: Nien-Hui Hsu, Miao Li County (TW);
Sen-Ming Hsu, Taipei Hsien (TW);
Lu-Wen Chien, Miao Li County (TW);
Wei-Jen Cheng, Miao Li County (TW)

(73) Assignee: Cortronic Corporation, Chu-Nan (TW)

( * ) Notice: Subject to any disclaimer, the term of this patent is extended or adjusted under 35 U.S.C. 154(b) by 654 days.

(21) Appl. No.: 11/490,160

(22) Filed: Jul. 21, 2006

(65) Prior Publication Data

US 2007/0024816 A1    Feb. 1, 2007

(30) Foreign Application Priority Data

Jul. 29, 2005    (TW) .............................. 94125838 A

(51) Int. Cl.
*G03B 21/18* (2006.01)
(52) U.S. Cl. .......................................... 353/57; 353/52
(58) Field of Classification Search .................... 353/52, 353/57
See application file for complete search history.

(56) References Cited

U.S. PATENT DOCUMENTS

| | | | |
|---|---|---|---|
| 6,322,218 B1 * | 11/2001 | Sugawara et al. ............... | 353/52 |
| 6,472,828 B1 * | 10/2002 | Pruett et al. .................... | 315/225 |
| 6,595,005 B1 * | 7/2003 | Immel .............................. | 62/3.7 |
| 6,709,111 B2 * | 3/2004 | Hirao et al. ..................... | 353/52 |
| 7,040,762 B2 * | 5/2006 | Yasuda ............................ | 353/52 |
| 7,088,058 B2 * | 8/2006 | Shiota et al. ................... | 315/291 |
| 7,128,421 B2 * | 10/2006 | Slobodin et al. ............... | 353/52 |
| 7,131,731 B2 * | 11/2006 | Oketani .......................... | 353/57 |
| 7,226,170 B2 * | 6/2007 | Hsu ................................. | 353/52 |
| 7,258,446 B2 * | 8/2007 | Jayaram et al. ................. | 353/52 |
| 2004/0239887 A1 * | 12/2004 | Yasuda ............................ | 353/57 |
| 2005/0213047 A1 * | 9/2005 | Slobodin et al. ............... | 353/52 |
| 2007/0024816 A1 * | 2/2007 | Hsu et al. ....................... | 353/57 |

FOREIGN PATENT DOCUMENTS

| | | |
|---|---|---|
| CN | 1412646 A | 4/2003 |
| TW | 536135 | 5/2002 |
| TW | M242760 | 2/2006 |

* cited by examiner

*Primary Examiner* — Georgia Y Epps
*Assistant Examiner* — Danell L Owens
(74) *Attorney, Agent, or Firm* — Birch, Stewart, Kolasch & Birch, LLP

(57) ABSTRACT

A cooling system for a projector is provided and disposed in the projector. When a sensing temperature of the projector sensed by a thermal sensor of the cooling system is higher than a maximum temperature, a control module controls a fan to increase a rotation speed. When the sensing temperature of the projector sensed by the thermal sensor is lower than a minimum temperature, the control module controls the fan to decrease the rotation speed. As a result, the temperature of the projector is maintained within a proper range.

13 Claims, 3 Drawing Sheets

COOLING SYSTEM

BACKGROUND OF THE INVENTION (1) Field of the Invention

The present invention generally relates to a cooling system, and particularly to a cooling system for a projector.

(2) Description of the Related Art

A projector has many kinds of heat source devices generating high heat. For example, the heat source device can be a light source device, a printed circuit board assembly, or a power supply system. Therefore, it is an important issue to cool the projector.

Please refer to FIG. 1. A cooling system 4 for a conventional projector 2 includes a plurality of fans 10, a thermal sensor 12 and a control module 14. The fans 10 are used for generating an air flow for dissipating heat generated by a heat source device 3 within the projector 2. The thermal sensor 12 is disposed near an air inlet 5 of the projector 2 to sense an environmental temperature.

The control module 14 includes a storage device 1402. A relationship F01 between the environmental temperature range and the voltage of the fan 10 is stored in the storage device 1402. For example, when the temperature is between 27° C. and 29° C., the voltage of the fan is controlled in 9V. When the temperature is between 20° C. and 31° C., the voltage of the fan is controlled in 10V. When the temperature is between 31° C. and 33° C., the voltage of the fan is controlled in 11V.

After the thermal sensor 12 senses the environmental temperature and looks up the temperature range in the relationship F01 pre-stored in the storage device 1402 to find a voltage corresponding to the environmental temperature. The control module 14 drives the fans 10 and controls the rotation speed of the fans 10 by the voltage corresponding to the environmental temperature. For example, after sensing the environmental temperature being 30° C., the thermal sensor 12 looks up the temperature range in the relation F01 pre-stored in the storage device 1402 to find a voltage, 10V, corresponding to the environmental temperature. Then, the control module 14 drives the fans 10 by the voltage in 10V.

However, the above method causes a lot of problems. For example, when the conventional projector 2 is used at a place with low air pressure, such as a high mountain, the cooling effect is poor. If the voltage is still provided according to the temperature range, the rotation speed of the fans 10 is relatively insufficient to cool the conventional projector 2. Practically, the rotation speed of the fans 10 increases and decreases by turns without obtaining ideal cooling effects. To solve this problem, a pressure sensor 13 sensing variations in air pressure is provided in the conventional projector 2 to adjust the voltage controlling the fans 10. However, a producing cost is increased greatly. Furthermore, when the fans 10 are on the end of the lifetime or piles up dust to decrease the cooling efficiency of the cooling system 4, the predetermined voltage is insufficient for dissipating heat within the conventional projector 2.

Moreover, when the heat source devices generates heat suddenly, the thermal sensor 12 is only able to sense the environmental temperature without sensing the temperature near the heat source devices. As a result, the rotation speed of the fans 10 is not changed, and the heat source devices can not be cooled. Thus, the method for controlling the voltage of the fans 10 by utilizing the thermal sensor 12 disposed near the air inlet 5 to sense the environmental temperature can not sense the temperature of the heat source device 3 in the projector 2. The heat source device 3 can not be cooled properly.

Therefore, the objective of the present invention is providing a cooling system for a projector to solve the above problem.

SUMMARY OF THE INVENTION

An objective of the present invention is to provide a cooling system for a projector by controlling a rotation speed of a fan properly to maintain a temperature of the projector within a proper range, especially when the projector is used at a place with various air pressures or when the fan is on the end of the lifetime.

Another objective of the present invention is to provide a cooling system for a projector. The cooling system having a thermal sensor disposed within the projector controls the rotation speed of the fan properly to cool heat source devices of the projector in a proper range of a temperature.

The present invention relates to a cooling system disposed in an apparatus, such as a projector. The cooling system is used for dissipating heat of a heat source device. For example, the heat source device can be a light source device, a board, or a power system. The cooling system includes at least one fan, a thermal sensor and a control module.

The fan is used for generating air flow to dissipate heat generated by the heat source device.

The thermal sensor is disposed in the apparatus for sensing a environmental temperature of the apparatus.

The control module controls the rotation speed of the fan according to a minimum temperature and a maximum temperature. The maximum temperature is higher than the minimum temperature.

When the thermal sensor senses a sensing temperature is higher than the maximum temperature, the control module controls the fan to increase the rotation speed. When the thermal sensor senses the sensing temperature is lower than the minimum temperature, the control module controls the fan to decrease the rotation speed.

Therefore, through the cooling system for the projector according to the present invention, the voltage of the fan is controlled by the control module according to the sensing temperature being higher or lower than the maximum temperature or the minimum temperature. When the projector is used in another different environment or when the fan is on the end of the lifetime, the rotation speed of the fan is controlled properly. As a result, the projector is cooled properly.

These and other objectives of the present invention will no doubt become obvious to those of ordinary skill in the art after reading the following detailed description of the preferred embodiment which is illustrated in the various figures and drawings.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
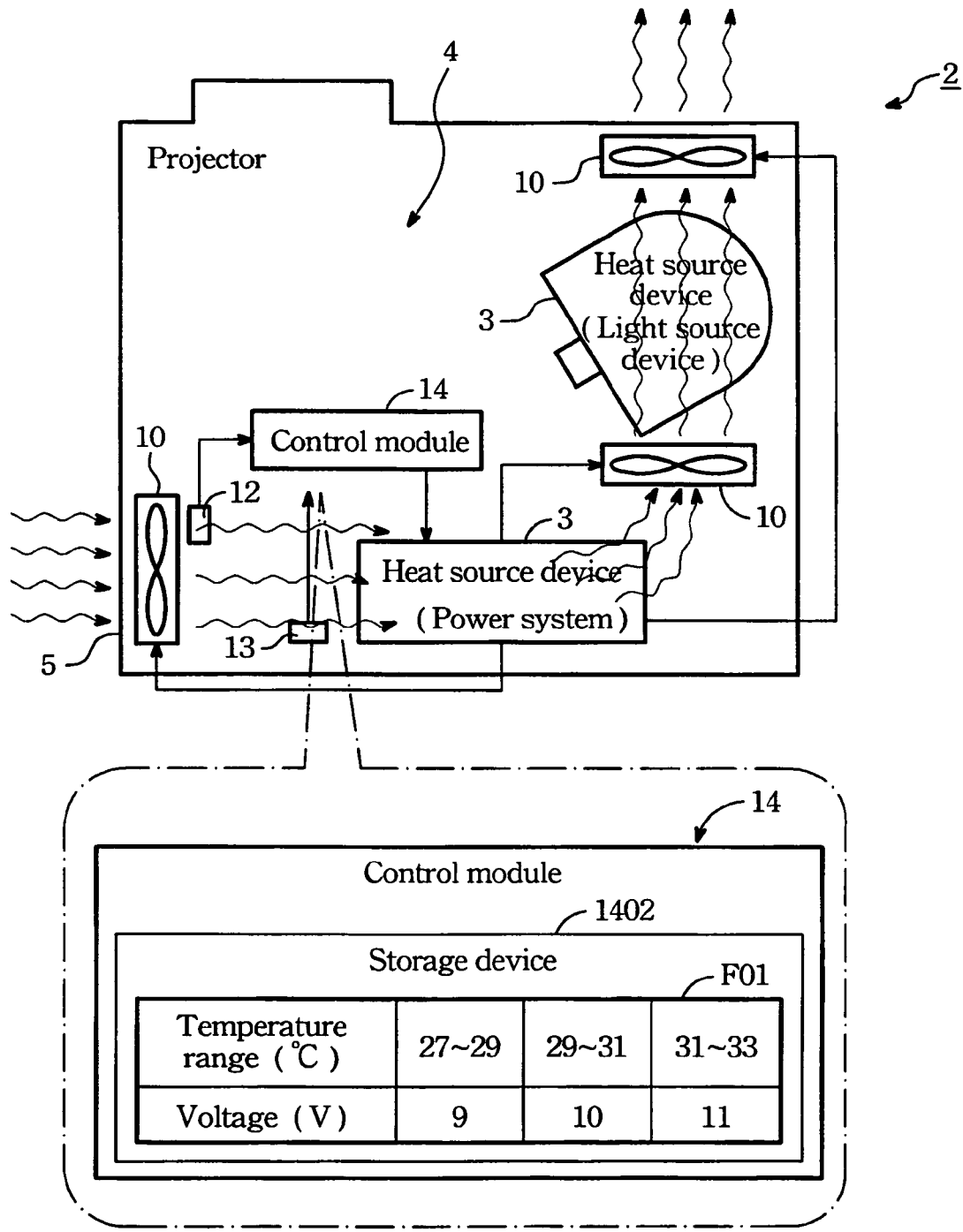
FIG. 1 illustrates a conventional cooling system.
Figure 2:
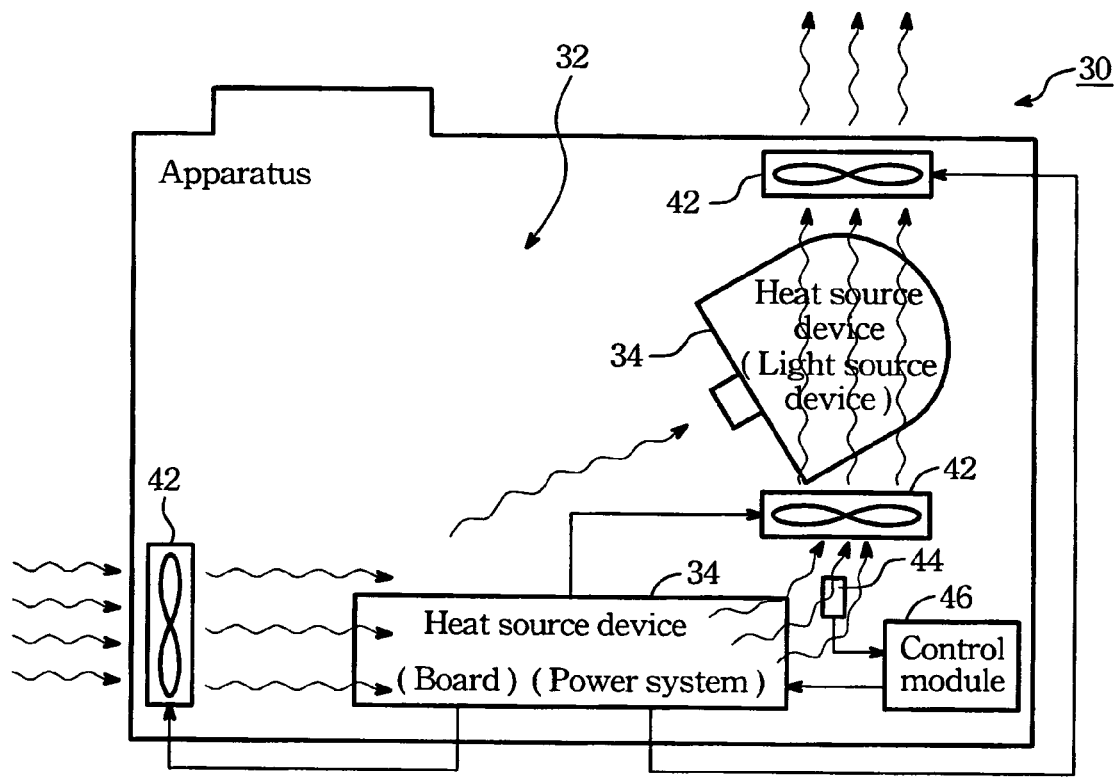
FIG. 2 illustrates a cooling system according to the present invention.

Please refer to FIG. 2. A cooling system 32 is disposed in an apparatus, such as a projector 30. The cooling system 32 is used for dissipating heat generated by at least one heat source device 34 in the projector 30. For example, the heat source device 34 can be a light source device, a printed circuit board assembly, or a power supply system. The cooling system 32 includes at least one fan 42, a thermal sensor 44 and a control module 46.

The fan 42 is used for generating an air flow to dissipate the heat generated by the heat source device 34. Air from external of the projector 30 is drawn into the projector 30 through an air inlet 5 to pass by the printed circuit board assembly, the power supply system, and then the light source device to dissipate the heat from the printed circuit board assembly, the power supply system, and the light source device. Finally, the air with heat dissipates out of the projector 30 through an opening (not shown) of the projector 30.

The thermal sensor 44 is disposed in the projector 30 for sensing the temperature of the projector 30. The thermal sensor 44 is disposed near the heat source device 34. In general, the air flow generated by the fan 42 flows toward the heat source device 34. In one embodiment(not shown), the thermal sensor 44 is disposed between the light source device and one of the fans 42. In anther embodiment shown in FIG. 2, the thermal sensor 44 is disposed between the power supply system and the light source device for sensing the temperature variation of the power supply system and the light source device directly. The control module 46 controls a rotation speed of the fan 42 according to a minimum temperature (Tc) and a maximum temperature (Tb), which are both pre-arranged. The maximum temperature is higher than the minimum temperature.

When the thermal sensor 44 senses the temperature that a sensing temperature is higher than the maximum temperature, the control module 46 controls the fan 42 to increase the rotation speed. When the thermal sensor 44 senses the temperature that the sensing temperature is lower than the minimum temperature, the control module 46 controls the fan 42 to decrease the rotation speed. As a result, the sensing temperature of the projector 30 is maintained within a proper range.

Figure 3:
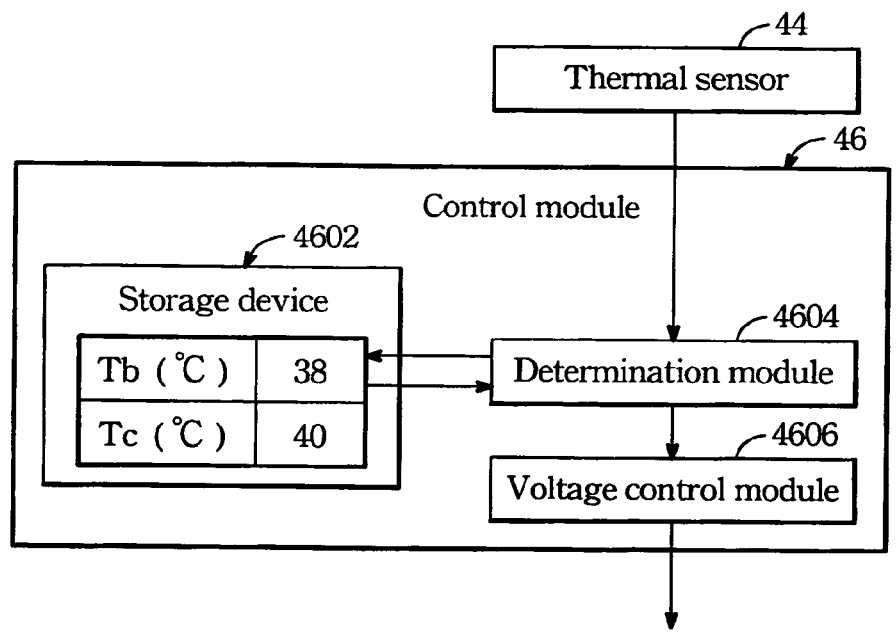
FIG. 3 illustrates a control module according to the present invention.

Please further refer to FIG. 3. The control module 46 further includes a storage device 4602, a determination module 4604 and a voltage control module 4606.

The storage device 4602 is used for storing the minimum temperature (Tc) and the maximum temperature (Tb). For example, in one of the present embodiment, the minimum temperature (Tc) is 38° C., and the maximum temperature (Tb) is 40° C.

The determination module 4604 is used for determining the temperature from the thermal sensor 44 being higher than the maximum temperature (Tb), which is pre-stored in the storage device 4602, or lower than the minimum temperature (Tc), which is pre-stored in the storage device 4602.

The voltage control module 4606 is for controlling a voltage to increase or decrease the rotation speed of the fan 42. The voltage is provided from the power supply system.

When the determination module 4604 determinates that the sensing temperature sensed by the thermal sensor 44 is higher than the maximum temperature (Tb), the voltage control module 4606 increases the voltage of the fan 42 to increase the rotation speed of the fan 42. When the determination module 4604 determinates that the sensing temperature sensed by the thermal sensor 44 is lower than the minimum temperature (Tc), the voltage control module 4606 decreases the voltage of the fan 42 to decrease the rotation speed of the fan 42.

The voltage control module 4606 controls the voltage of the fan 42 to increase or decrease the rotation speed of the fan 42 according to a relationship between voltage and time. As a result, the cooling system 32 is operated more smoothly.

Furthermore, when the voltage control module 4606 increases or decreases the voltage of the fan 42, the voltage control module 4606 further determinates a relation ship between the increased/decreased voltage and a maximum voltage/a minimum voltage to maintain the voltage controlling the fan 42 between the maximum voltage and the minimum voltage.

When the decreased voltage is lower than the minimum voltage, the voltage control module 4606 provides the fan 42 with the minimum voltage. When the increased voltage is higher than the maximum voltage, the voltage control module 4606 provides the fan 42 with the maximum voltage.

Figure 4:
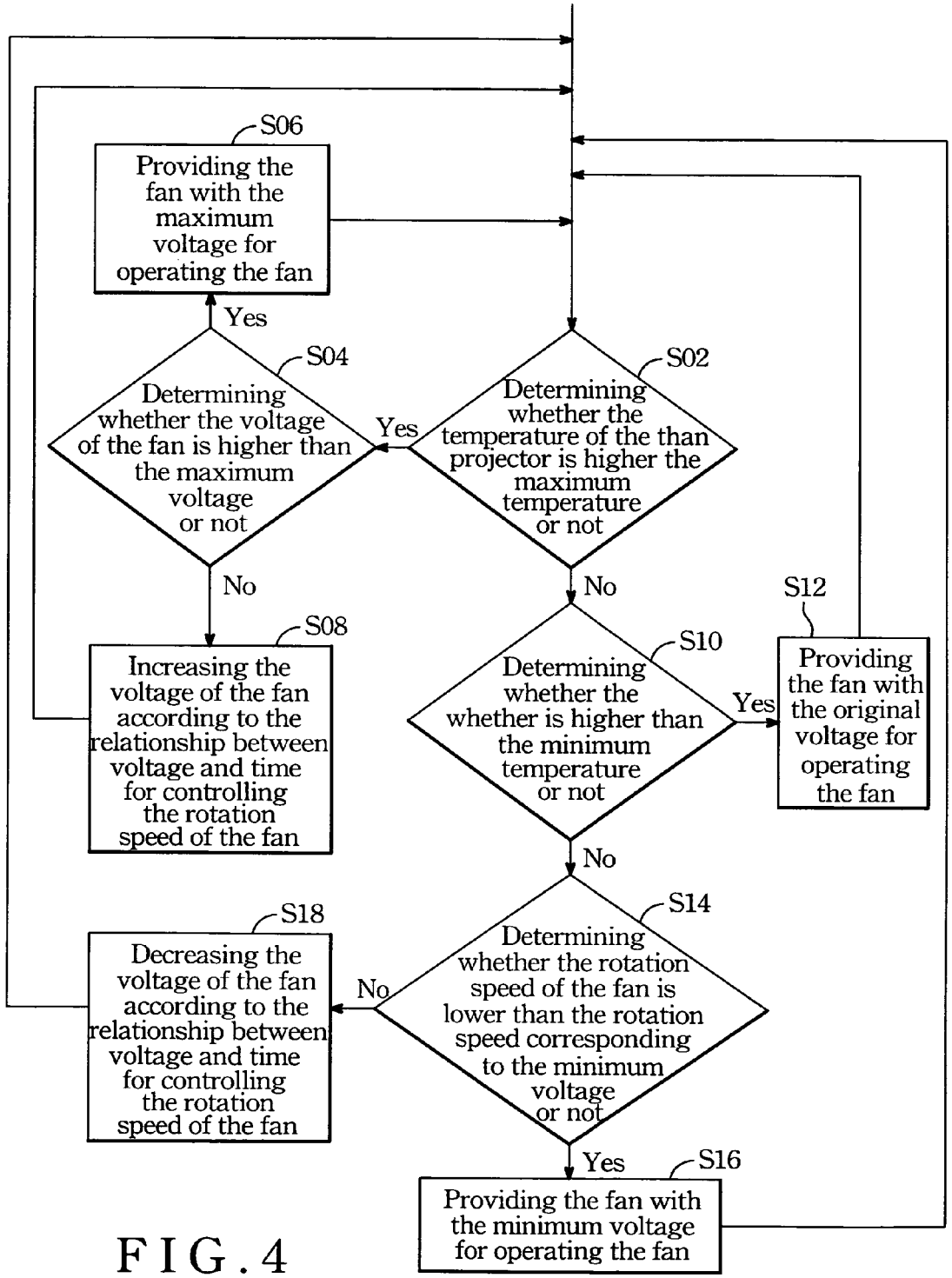
FIG. 4 is a flow chart of a determining method of the determination module according to the present invention.

Please refer to FIG. 4. A determining method of the determination module 4604 in the control module 46 includes following steps.

Step S02: determining whether the temperature of the projector 30 is higher than the maximum temperature or not.

If step S02 is true, then it goes to step S04: determining whether the voltage of the fan 42 is higher than the maximum voltage or not.

If step S04 is true, then it goes to step S06: providing the fan 42 with the maximum voltage for operating the fan 42.

If step S04 is false, then it goes to step S08: increasing the voltage of the fan 42 according to the relationship between voltage and time for controlling the rotation speed of the fan 42.

If step S02 is false, then it goes to step S10: determining whether the temperature is higher than the minimum temperature or not.

If step S10 is true, then it goes to step S12: providing the fan 42 with the original voltage for operating the fan 42.

If step 10 is false, then it goes to step S14: determining whether the rotation speed of the fan 42 is lower than the rotation speed corresponding to the minimum voltage or not.

If step S14 is true, then it goes to step S16: providing the fan 42 with the minimum voltage for operating the fan 42.

If step S14 is false, then it goes to step S18: decreasing the voltage of the fan 42 according to the relationship between voltage and time for controlling the rotation speed of the fan 42.

Therefore, the cooling system 32 for the projector 30 according to the present invention utilizes the thermal sensor 44 disposed near the heat source device 34 to directly sense the variation of the temperature of the heat source device 34. The control module 46 controls the voltage of the fan 42 by determining the temperature that is the sensing temperature sensed by the thermal sensor 44 and the maximum temperature/the minimum temperature. As a result, when the projector is used in another environment or when the fan 42 is disposed on the end of the lifetime, the rotation speed of the fan 42 is controlled properly. Even when the heat source device 34 generates the heat suddenly, the rotation speed of the fan 42 still is controlled properly. Therefore, the temperature of the projector is maintained within a proper range.

For example, when the projector 30 is not shut down by a normal process, the light source device is not cooled properly. As a result, the heat is generated by the light source device. The temperature of the light source device is directly sensed by the thermal sensor 44. Then, the fan 42 is controlled to cool the light source device. Also, the projector 30 can be controlled to stop lighting the light source device. After the thermal sensor 44 senses the temperature that the sensing temperature of the light source device is back to a normal status, the light source device is lighted again. As a result, the projector 30 is cooled to a proper temperature, and the time of failure for lighting is reduced. Also, the light source device is avoided to be burnt down due to an overheating.

With the example and explanations above, the features and spirits of the present invention are hopefully well described. Those skilled in the art will readily observe that numerous modifications and alterations of the device may be made while retaining the teaching of the present invention. Accordingly, the above disclosure should be construed as limited only by the metes and bounds of the appended claims.

We claim:

1. A cooling system for dissipating heat generated by at least one heat source device in a projector, the cooling system comprising:
    at least one fan for generating an air flow to dissipate the heat generated by the heat source device;
    a thermal sensor disposed in the projector for sensing a temperature of the projector, wherein the thermal sensor is disposed between a light source device and a power supply system; and
    a control module disposed in the projector for controlling a rotation speed of the fan according to a first predetermined temperature and a second predetermined temperature, the first predetermined temperature being higher than the second predetermined temperature, the control module controlling the fan to increase the rotation speed at a sensing temperature of the projector being higher than the first predetermined temperature and the control module controlling the fan to decrease the rotation speed at the sensing temperature being lower than the second predetermined temperature,
    wherein the control module further comprises a voltage control module for controlling a voltage provided from the power supply system of the projector to increase or decrease the rotation speed of the fan according to a relationship between voltage and time, and the control module is for determining a relationship between the increased/decreased voltage and a maximum voltage/a minimum voltage to maintain the voltage controlling the fan between the minimum voltage and the maximum voltage,
    wherein if the sensing temperature is between the first predetermined temperature and the second predetermined temperature, the voltage provided from the power supply is not changed.

2. The cooling system of claim 1, wherein the thermal sensor is disposed near the heat source device.

3. The cooling system of claim 1, wherein the heat source device is selected from a group consisting of the light source device, a printed circuit board assembly, and the power supply system.

4. The cooling system of claim 3, wherein the thermal sensor is disposed near the light source device.

5. The cooling system of claim 1, wherein the control module further comprises:
    a storage device used for storing the first predetermined temperature and the second predetermined temperature; and
    a determination module used for determining the sensing temperature being higher than the first predetermined temperature or lower than the second predetermined temperature or between the first predetermined temperature and the second predetermined temperature.

6. A cooling system for dissipating heat generated by at least one heat source device in a projector, the cooling system comprising:
    at least one fan for generating an air flow to dissipate the heat generated by the heat source device;
    a thermal sensor disposed in the projector and near the heat source device for sensing a temperature of the heat source device, wherein the thermal sensor is disposed between a light source device and a power supply system; and
    a control module connected to the thermal sensor and the fan for controlling a rotation speed of the fan according to a sensing temperature of the heat source device sensed by the thermal sensor,
    wherein the control module further comprises a voltage control module controlling a voltage provided from the power supply system for controlling the rotation speed of the fan according a relationship between voltage and time, and the voltage control module is for determining a relationship between the increased/decreased voltage and a maximum voltage/a minimum voltage to maintain the voltage controlling the fan between the Minimum voltage and the maximum voltage,
    wherein if the sensing temperature is between a first predetermined temperature and a second predetermined temperature, the voltage provided from the power supply is not changed.

7. The cooling system of claim 6, wherein the first predetermined temperature is higher than the second predetermined temperature, and the control module controls the fan to increase the rotation speed at the sensing temperature being higher than the first predetermined temperature and to decrease the rotation speed at the sensing temperature being lower than the second predetermined temperature.

8. The cooling system of claim 6, wherein the heat source device is selected from a group consisting of the light source device, a printed circuit board assembly, and the power supply system.

9. The cooling system of claim 8, wherein the thermal sensor is disposed near the light source device.

10. The cooling system of claim 8, wherein the thermal sensor is disposed between the light source device and the printed circuit board assembly.

11. A method of determining a voltage supplied to a fan of a projector for controlling a rotating speed of the fan, wherein the projector comprises a thermal sensor for sensing a temperature of the projector, the method comprises the following steps:
    determining whether a sensing temperature of the projector is higher than a first predetermined temperature or not;
    if the sensing temperature of the projector is higher than the first predetermined temperature, determining whether a voltage of the fan is lower than a first predetermined voltage or not;
    if the sensing temperature of the projector is higher than the first predetermined temperature and the voltage of the fan is lower than the first predetermined voltage, increasing the voltage of the fan to increase the rotation speed of the fan;
    if the sensing temperature of the projector is lower than the first predetermined temperature, determining whether the sensing temperature of the projector is higher than a second predetermined temperature or not;
    if the sensing temperature of the projector is lower than the second predetermined temperature, determining whether the voltage of the fan is higher than a second predetermined voltage or not;
    if the sensing temperature of the projector is lower than the Second predetermined temperature and the voltage of the fan is higher than the second predetermined voltage, decreasing the voltage of the fan to decrease the rotation speed of the fan; and if the sensing temperature of the projector is higher than the second predetermined temperature and lower than the first predetermined temperature, keeping a voltage provided to the fan unchanged for operating the fan.

12. The method of claim 11, wherein if the sensing temperature of the projector is higher than the first predetermined temperature and the voltage of the fan is higher than the first predetermined voltage, provide the fan with the first predetermined voltage for operating the fan.

13. The method of claim 11, wherein if the sensing temperature of the projector is lower than the second predetermined temperature and the voltage of the fan is lower than the second predetermined voltage, provide the fan with the second predetermined voltage for operating the fan.

* * * * *